United States Patent [19]
Eppler, Jr. et al.

[11] Patent Number: 5,600,714
[45] Date of Patent: Feb. 4, 1997

[54] CONFERENCE TELEPHONE USING DYNAMIC MODELED LINE HYBRID

[75] Inventors: William G. Eppler, Jr.; David Neaderland, both of Norwalk, Conn.

[73] Assignee: Sound Control Technologies, Inc., Norwalk, Conn.

[21] Appl. No.: 182,761

[22] Filed: Jan. 14, 1994

[51] Int. Cl.$^6$ .............................. H04M 9/08; H04B 3/20
[52] U.S. Cl. ......................... 379/390; 379/388; 379/410; 379/406
[58] Field of Search ................................ 379/388, 390, 379/391, 406, 410, 411, 420, 432; 370/32.1

[56] References Cited

U.S. PATENT DOCUMENTS

| | | | |
|---|---|---|---|
| 4,225,754 | 9/1980 | Bernard et al. | 379/420 |
| 4,360,712 | 11/1982 | Horna | 379/406 |
| 4,479,036 | 10/1984 | Yamamoto et al. | 379/410 |
| 4,535,206 | 8/1985 | Falconer | 370/32.1 |
| 4,648,111 | 3/1987 | Ito | 379/411 |
| 4,912,758 | 3/1990 | Arbel | 379/388 |
| 4,998,241 | 3/1991 | Brox et al. | 370/32.1 |
| 5,050,160 | 9/1991 | Fuda | 379/410 X |
| 5,099,472 | 3/1992 | Townsend et al. | 379/390 X |
| 5,121,426 | 6/1992 | Baumhauer, Jr. et al. | 379/432 X |
| 5,263,019 | 11/1993 | Chu | 370/32.1 |
| 5,353,279 | 10/1994 | Koyama | 379/410 X |
| 5,353,348 | 10/1994 | Sendyk et al. | 379/410 |
| 5,384,843 | 1/1995 | Masuda et al. | 379/390 X |

FOREIGN PATENT DOCUMENTS

| | | |
|---|---|---|
| 0053202 | 6/1982 | European Pat. Off. . |
| 0135843 | 4/1985 | European Pat. Off. . |

OTHER PUBLICATIONS

The Transactions of the IECE of Japan, vol. E 65, No. 1 (Jan. 1982) "An Adaptive Echo Canceller with Variable Step Gain Method".

*Primary Examiner*—Ahmad F. Matar
*Assistant Examiner*—Devendra T. Kumar
*Attorney, Agent, or Firm*—Handal & Morofsky

[57] ABSTRACT

A speaker telephone for use with a two wire telephone system and incorporating an audio input circuit for receiving an audio signal to be transmitted over a conventional two-wire telephone system is disclosed. A transmitted signal processing circuit for receiving the audio signal and altering the audio characteristics provides the altered audio signal at the output of the signal processing circuit to the input of the two wire telephone system. A first line hybrid echo canceler is coupled to receive the output of the transmitted signal processing circuit and produce a plurality of first echo outputs in response to the transmitted signal processing circuit output and has a first error signal input. A first difference circuit has an input of first polarity and is coupled to the output of the input coupling circuit, and inputs of opposite polarity coupled to the echo outputs of the first line hybrid echo canceler. The difference circuit has a difference output producing the difference between signals present at the first polarity input and a pair of opposite polarity inputs. The output of the first difference circuit is coupled to the first error signal input. An audio output circuit is coupled to the output of the difference circuit and has an electrical output coupled to a loudspeaker.

26 Claims, 2 Drawing Sheets

CONFERENCE TELEPHONE USING DYNAMIC MODELED LINE HYBRID

TECHNICAL FIELD

The present invention relates to circuits for providing duplex telecommunication over telephone lines in the context of a conference or speaker telephone system comprising a loudspeaker and a microphone.

BACKGROUND

One very basic aspect of face-to-face human communication is the ability of the two parties to both talk and be heard at the same time. This aspect of personal communication is quite important, insofar as it enables parties to a conversation to interrupt each other when necessary and thus build substantial efficiency into their communication. It is also important in other respects, for example, in the event that one party is beginning to speak about something which may, perhaps unknown to him, be uncomfortable to a party to the conversation, off the subject, incorrect or otherwise destructive of the object of the communication or wasteful of time.

While the ability to interrupt the speech of another seems quite natural, it is an aspect of face-to-face communication not found in many electronic telecommunications systems. Indeed, the ability to both speak and be heard at the same time presents technical complications in most telecommunication systems. For example, if we consider radio frequency carrier wave transmissions, if two parties to a conversation transmit at the same time, the signals will interfere with each other causing beat frequency oscillations, feedback and the like. Systems which solve this problem and thus allow the parties to the conversation to both speak and be heard at the same time are referred to as duplex systems. This can be achieved, for example, in the case of radio frequency communication, by a pair of transmitters operating with a respective pair of receivers at two different frequencies, one assigned to each of the transmissions of the parties.

In contrast, until the introduction of speaker telephones, virtually all telephones were duplex systems. Generally, the operative heart of such telephone systems during this period substantially comprised the equivalent of the series combination of a pair of variable resistance carbon microphones and a pair of electromagnetic earphones. As one caller spoke over the line, a diaphragm coupled to a carbon powder compartment in the microphone caused successive compressions to be exerted against the carbon powder in the compartment, thus varying the electrical resistance of the compartment. This in turn varied the current passing through the series circuit resulting in a modulation of the current passing through the series combination to generate the telephone signal. This modulated signal, modulated at the actual frequency of the voice signal being transmitted, was present in the telephone system at the telephone set of both participants to the telephone conversation. This system, which continues in use, in principle unchanged from the original instruments developed by Bell in the 1870's, as noted above, inherently has a duplex characteristic. Duplex communication is achieved because the audio frequencies involved do not cause unacceptable interference with each other and because the gain of the feedback loop between the carbon microphone and the earphone is less than one.

With the advent of speaker telephones, it became necessary to introduce into the telephone instrument an audio amplifier for receiving audio signals from the telephone central office and amplifying them to drive a loudspeaker. This immediately presented the problem of preventing feedback between a microphone adjusted for sensitivity to the voice of a person, who is not speaking directly and proximately into it, while making the system unresponsive to audio signals introduced into the environment by the loudspeaker which could be very close to the microphone. To somewhat better understand this problem, it must be kept in mind that the telephone is a two-wire system used to carry both the transmitted and received signal. If the transmitted signal is thus allowed to be amplified by the amplifier which amplifies the received signal which is also carried on the same two wires, ambient noise will be amplified and feedback oscillations are likely to ensue at normal levels of speaker amplitude.

One approach to this problem was embodied in speaker telephone systems which included separate microphones and loudspeakers, both of which had some directional characteristic designed to ensure that audio on the loudspeaker would be loud enough for the telephone user to hear while at the same time having, perhaps, less audio field strength at some point where the microphone was placed. In addition, the solution involved a microphone whose directional sensitivity characteristic was directed toward the mouth of the individual using the system with minimal sensitivity in the vicinity of the speaker.

Thus, design objectives involved reducing the gain of the feedback loop between the microphone and the speaker to less than one with the volume control for the system set at a level which would allow easy intelligibility of the signal.

Such an approach does not, in principle, provide a commercially acceptable level of performance, as, for example, it imposes limits on the location of the parties to the conversation, maximum loudspeaker volume and minimum user voice levels. Moreover, the provision of several microphones is required in order to achieve good spatial separation between the microphone and the speaker and, as a result, the system becomes somewhat cumbersome physically. As a practical matter, it is also necessary for the user to adjust the position of the various parts of the system as well as the volume on it. For persons without technical ability and patience, successful operation of such a system was a hit or miss proposition and, in practice, even a reasonable facsimile of the best possible performance of the system was seldom achieved, with most users settling for barely operational configurations.

Another approach to this problem and one which is probably most widespread in modern communication systems is the sacrifice of duplex operation to relatively trouble-free speaker telephone operation. Generally, these systems incorporate an electronic switch which either turns off the speaker when the user is speaking or disables the microphone when the party at the other end of the telephone is speaking and monitors signal magnitudes when signals are being produced at both ends of the telephone conversation to determine whether the system will receive or transmit.

In accordance with so-called "hybrid" technology, a solution to the speaker telephone problem, without the above difficulty, has been approached. Generally, such systems operate by introducing a hybrid electronic circuit, which is meant to approximate the complex impedance of the telephone system, and which is used to produce a cancellation signal. This cancellation signal, when added to the signal on the telephone system (comprising both the transmitted and received signal) results in generating a third signal which includes only the received signal, which third signal is, in turn, sent to the amplifier and loudspeaker of the speaker telephone system.

Some idea of the complexity of the problem of generating an effective hybrid circuit can be appreciated when one considers the range of overall impedances which must be accommodated by the system. It has been reported that in one series of measurements from a single location involving calls to the same local exchange, calls to other local exchanges, calls to suburban exchanges and long distance calls to different area codes, those measurements in the range of ±1 standard deviation at 200 to 5000 Hz yielded results varying from 450 to 1700 ohms. Thus, the 600 ohm impedance routinely referred to in the literature as the impedance of a telephone line is, from a practical standpoint, of minimal importance to many applications.

Moreover, while the purely resistive component of the impedance of a telephone line is for a given telephone call relatively well behaved, the reactive component includes both capacitive and inductive components. This results in the net impedance varying with frequency both in magnitude (resistance plus reactance) and in sign (net inductive reactance or capacitive reactance).

The net inductive/capacitive component is commonly referred to as the imaginary portion of the impedance or the reactance while the resistive component of the impedance is referred to as the real component.

While such an approach would in theory appear to provide a perfect solution to duplex speaker telephone operation, as a practical matter, the approach suffers from several inadequacies. Firstly, telephone system line impedances vary greatly from system to system in different parts of the country and even from exchange to exchange within the same city. Thus, it becomes necessary for the system to be installed and a complex impedance adjusted to minimize feed through of the signal to be transmitted into the telephone speaker amplifier. Naturally, this represents a substantial expense insofar as it involves having a technician on site for installation of the system. The increase in cost is significant enough that, for the great majority of users, such systems are not, from an economic standpoint, a practical option.

Moreover, even after such a system is installed, experience has shown that the complex impedance of the telephone lines will vary from call to call and from time to time depending upon the lines being used by the central office switching system, environmental factors, and the like. Thus, the above on site adjusted systems, at best, represent only an approximation and, for that matter, an approximation of irregular quality depending upon the nature of the particular telephone system with which they are used.

In an attempt to address this problem, systems such as that described in U.S. Pat. No. 5,172,410 of Chace have been proposed. In such systems, a multiple tone measurement and adjustment sequence at the beginning of a telephone call is used. This is achieved by applying a plurality of tones of different frequency to the telephone line, measuring the complex received signal and then adjusting a synthesized RLC hybrid circuit to more closely correspond to the telephone line and then repeating that process, until an acceptable degree of conformity between the hybrid and the telephone line is achieved. The obvious cost of such a system is the presence of tones at the outset of the call and the fixed response of the system to what may be varying and even live characteristics.

SUMMARY OF THE INVENTION

The invention as claimed is intended to provide a remedy. It solves the problem of how to provide duplex communication over conventional telephone lines with good audio characteristics and substantially without the above discussed problems. In addition, adjustment of the system without the cost of having tones over the telephone line is achieved. The same is achieved by incorporating in a speaker telephone for use with a two wire telephone system an audio input circuit for receiving an audio signal to be transmitted over a conventional two-wire telephone system. A transmitted signal processing circuit receives the audio signal and alters the audio characteristics to provide the altered audio characteristics at the output of the signal processing circuit. An output coupling circuit is coupled to the output of the transmitted signal processing circuit and connected to couple the altered audio signal output of the transmitted signal processing circuit to the input of the two wire telephone system. An input coupling circuit couples the output wire of the two wire telephone system to the speaker telephone. A first line hybrid echo canceler is coupled to receive the output of the transmitted signal processing circuit and produce a plurality of first echo outputs in response to the transmitted signal processing circuit output and has a first error signal input. A first difference circuit has an input of first polarity and is coupled to the output of the input coupling circuit, and inputs of opposite polarity coupled to the echo outputs of the first line hybrid echo canceler. The difference circuit has a difference output producing the difference between signals present at the first polarity input and a pair of opposite polarity inputs. The output of the first difference circuit is coupled to the first error signal input. An audio output circuit is coupled to the output of the difference circuit and has an electrical output. A loudspeaker is coupled to the output of the audio output circuit to convert the electrical output into a desired audio signal to be heard by the user of the telephone. In accordance with the preferred embodiment, a room echo cancelling subsystem is also provided.

BRIEF DESCRIPTION OF THE DRAWINGS

One way of carrying out the invention is described in detail below with reference to drawings in which.

BEST MODE FOR CARRYING OUT THE INVENTION

Figure 1:
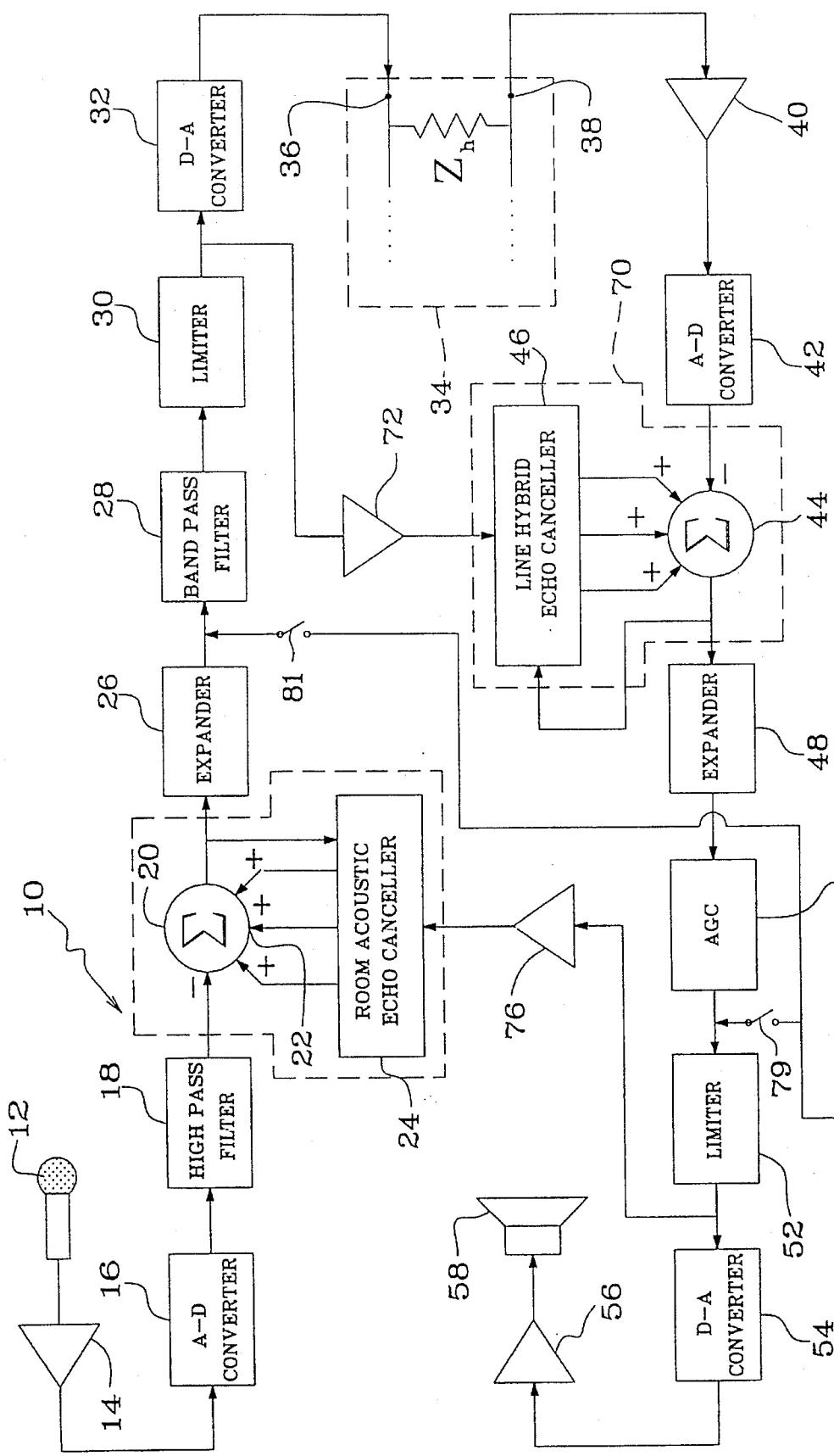
FIG. 1 is a block diagram of the inventive telephone system.

Turning to FIG. 1, a speaker telephone system constructed in accordance with the present invention is illustrated. Speaker telephone system 10 comprises a microphone 12 which is adopted to receive the voice of the individual using the system 10. The output of the microphone is sent through appropriate amplifiers 14 to an analog-to-digital converter 16.

The output of analog-to-digital converter 16 is sent to a microprocessor which is programmed, in a manner well known in the art, to act as a high pass filter 18 having a low frequency cutoff of 100 hertz. In accordance with the present invention, high pass filter 18 is designed as an eight pole filter. Of course, a conventional analog construction of the FIG. 1 circuit is possible with substantially the same results.

The effect of high pass filter 18 is to remove low frequency sounds which may enter the system through microphone 12. These would include such things as air conditioner rumble, footsteps and other sounds which are well outside of the normal ranges of the voice frequencies which the system is designed to pass. The output of high pass filter 18 is then sent to a digital adding circuit 20. Adding circuit 20 has a second input 22 which is driven by a room acoustic echo canceler 24, whose operation will be described in detail below.

The output of digital adder 20 is, in turn, coupled to a gate expander 26. Expander 26 has the characteristic of reducing signals below a desired minimum threshold thus reducing any residual low volume noise. Above the threshold, signals are output at the same amplitude at which they are input. For signals below the threshold of expander 26, they are reduced by an amount proportional to the amount below the threshold voltage that their amplitude takes. For example, signals just below the threshold will be slightly reduced while signals far below the threshold will be very greatly reduced in amplitude at the output of the expander 26.

The output of expander 26 is sent to a bandpass filter 28 which, like expander 26, is also a digital device and is designed to have a bandpass between 300 hertz and 3.4 kilohertz. The output of bandpass filter 28 is then sent to a limiter 30 which has the characteristic of limiting the maximum amplitude of any signals received from bandpass filter 28. Limiter 30 is also a digital circuit such as a microprocessor or the like. The positioning of expander 26, bandpass filter 28 and limiter 30, and possibly other audio processing circuits before the input to the echo canceler driver 72 is of particular importance because direct connection of the echo canceler to the audio input of the speaker telephone will cause the echo canceler to null out the natural frequency limiting characteristic of the two wire telephone system and these transmitted audio signal processing circuits, thus increasing transmitted bandwidth unacceptably.

The output of limiter 30 is then sent to a digital-to-analog converter 32, whose output is sent to the two wire telephone system 34 at input terminal 36. Signals received over two wire telephone system 34 appear at system output terminal 38. This signal is connected to the received signal input of system 10 and after suitable amplification is provided by an amplifier 40 to an analog-to-digital converter 42. The output of analog-to-digital converter 42 is provided to digital adder 44. Digital adder 44 is also provided at its other input with the output of line hybrid echo canceler 46. The output of adder 44 is, in turn, coupled to a gate expander 48, which has a characteristic of suppressing low amplitude noise below a threshold by reducing signals in an amount proportional to the extent to which their amplitude is below the threshold. For example, if signals are just below the threshold, they are very slightly reduced in amplitude, whereas if signals are very far below the threshold, they are greatly reduced in amplitude.

The output of expander 48 is sent to an automatic gain control circuit 50, which provides an output which is substantially the same in amplitude regardless of whether the signal input into AGC circuit 50 is a signal internal to the local telephone installation or a signal of lower amplitude coming from a remote location. The output of AGC circuit 50 is provided to a limiter 52, which simply prevents signals from exceeding a limit and overdriving the rest of the system. The output of limiter 52 is, in turn, sent to a digital-to-analog converter 54, whose output is amplified by an amplifier 56 which drives an output loudspeaker 58.

Insofar as expander 48, automatic gain control circuit 50 and limiter 52 are working in the digital domain, all of these circuits must be digital circuits. Likewise, as noted above, high pass filter 18, expander 26, bandpass filter 28, limiter 30 and adders 20 and 44, also all operate in the digital domain and are digital circuits. Moreover, as noted above, all of these circuits can, in principle, be replaced by analog circuits and substantially similar operation can be achieved, but in such case, the rest of the circuit would probably also be analog and the conversion into digital performed by the analog-to-digital converters and the inverse conversion by the digital-to-analog converters would not be done.

As noted above, the two-wire telephone system 34 of the telephone company has a hybrid impedance $Z_h$. This results in the transfer of transmitted signals present at the output of digital-to-analog converter 32 to the input of amplifier 40 and, ultimately, this could cause reproduction of the signals at speaker 58, completing an undesirable feedback loop through microphone 12.

In accordance with the present invention, it has been recognized that the characteristics of the two-wire telephone system 34 may be viewed as an echo-producing system in which all signals present at its input terminal 36 appear finite periods of time later at its output terminal 38. Thus, a device which receives input signals and produces cancellation signals having the same waveform but different amplitudes delayed by specific discrete time periods should have the effect of substantially canceling the input signal at terminal 36 from the output waveform at terminal 38. Exactly this sort of function is provided by a cascadable adaptive finite impulse response (CAFIR), digital filter chip manufactured by Motorola, Inc. and sold under its catalog Number DSP 56200. The DSP 56200 integrated circuit may be modeled as a delay line having an input and an output, a number of output taps corresponding to different delays, means for varying the amplitude of the signal present at each of the taps and means for summing all of the thus amplitude varied tap outputs.

Figure 2:
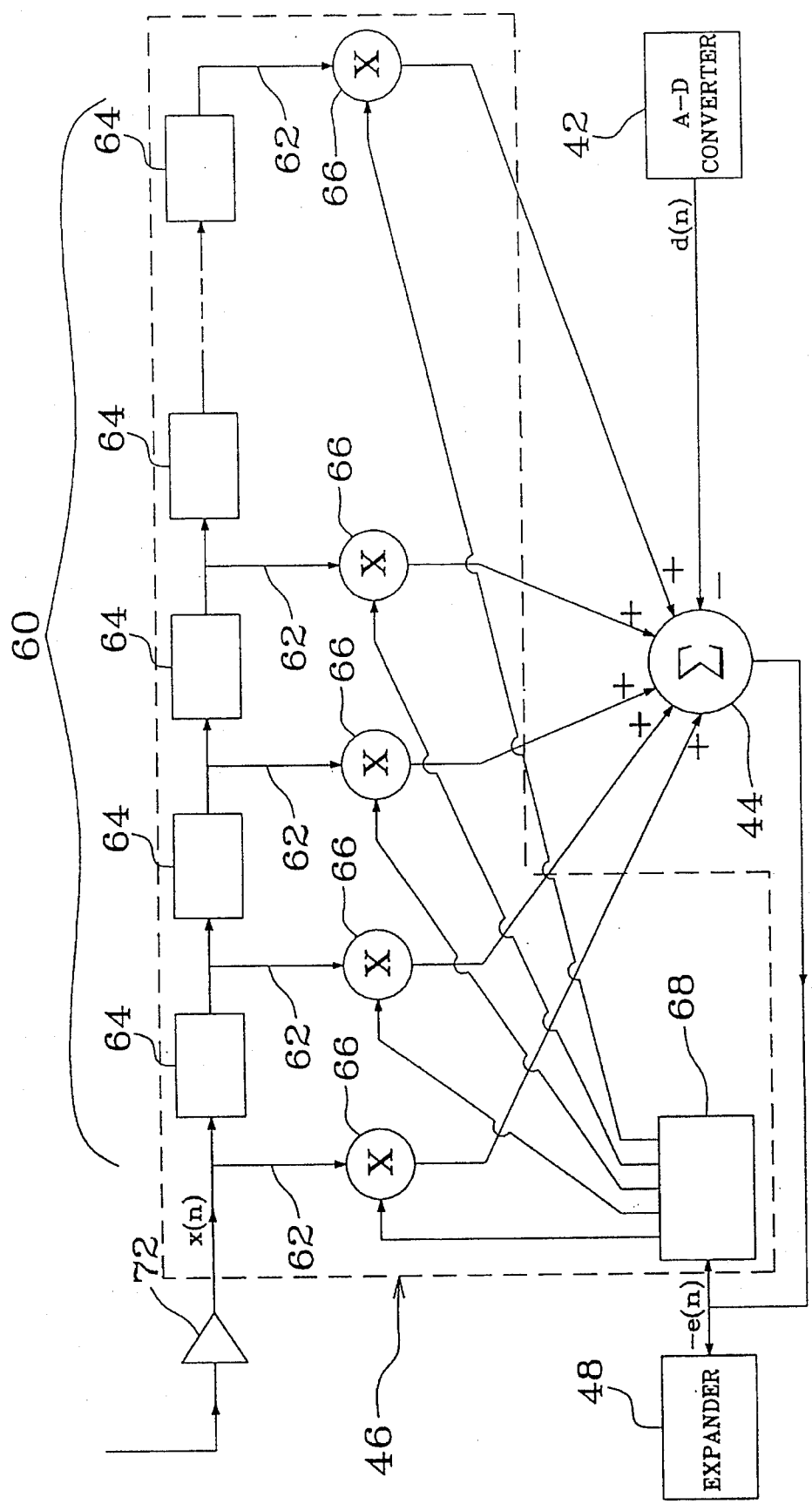
FIG. 2 is a block diagram showing the hybrid model of FIG. 1.

As can be seen in FIG. 2, line hybrid echo canceler 46 comprises a delay line 60 having a plurality of taps 62 and individual delay elements 64. The output of taps 62, which represent a plurality of echo outputs are sent to scaling circuits 66. The scaling circuits each receive a scaling factor from digital logic subsystem 68 in the chip. The scaled echo outputs are then sent to adder 44 which acts as a difference circuit, as it has a plurality of inputs receiving the scaled echo outputs of one sign, and an input of opposite sign or polarity. The structure which is illustrated in FIG. 2 in and of itself forms no part of the present invention and is well known in the art and commercially on the market in the form of the above-referenced Motorola integrated circuit, which appears as a single chip 70 as illustrated in FIG. 1.

As noted above, the defects in the desired received signal caused by the transmitted signal and the two-wire telephone system 34 can be modeled as a series of echoes of varying amplitude. Accordingly, a sample of the transmitted signal is taken from the output of limiter 30 and sent to an amplifier 72 to chip 70, passing through delay line 60 within the chip to result in a series of delayed signals which function as artificial echoes. These echoes are sent to their respective scaling circuits 66 which in turn provide them to digital adder 44 which produces an output −by adding all the scaled echoes together and subtracting from the total of all the scaled echoes the digital receive signal, d(n), provided at the output of analog-to-digital converter 42.

Chip 70 has the characteristic of following an algorithm which varies the scaling factors of scaling circuit 66 until the output −e(n) of digital adder 44 is at a minimum. Insofar as the delays and amplitudes associated with the numerous echoes in the modeled characteristics of two-wire telephone system 34 are substantially constant, the DSP chip 70 will be able to reduce the amount of transmitted signal x(n) almost to zero, once the scaling factors associated with scaling circuit 66 have values which match the characteristics of two-wire telephone system 34. While the DSP chip will continually attempt to reduce all signals to zero, the received voice signal, because it is completely independent of the transmitted signal, will be unaffected.

DSP chip 70 is able to determine whether its output −e(n) has reduced the transmitted signals substantially to zero because that output is compared to the transmitted signal x(n) as illustrated in FIG. 1, thus ensuring that d(n) has had any remnants of the transmitted signal removed from it before passing to expander 48 in the form of signal −e(n).

In accordance with the preferred embodiment of the invention, the system is further provided with a second echo canceler, in principle identical to the echo canceler illustrated in FIG. 2, for the purpose of canceling actual acoustical echoes in the room with the speaker telephone 10 being used. More particularly, room acoustic echo canceler 24 is coupled via amplifier 76 to the digital version of the signal which drives speaker 58.

The object of this circuit is to be certain that audio signals transmitted directly from speaker 58 to microphone 12, or indirectly transmitted from speaker 58 to microphone 12 by first reflecting against various objects in the room where the speaker telephone is located, are canceled. These undesirable signals are actual physical echoes and are simply canceled by the delay line structure of echo canceler 24 whose various scaled tabs correspond to various paths including the direct path between speaker 58 and microphone 12, as well as other paths. Such paths may be numerous paths corresponding to various reflection surfaces provided by objects in the room, various portions of the walls of the rooms, individuals in the room, and so forth.

In principle, both the room acoustic echo canceler 24 and the line hybrid echo canceler 46 can, without assistance, during use, adapt to both initial conditions and to changes in conditions in both the room and the two-wire telephone system. In principle, it is also possible to simply store the scaling factors associated with the various "echoes" and start the system with a set of pre-programmed scaling factors which reflect the condition of the system at the last time that it was used. However, in accordance with the preferred embodiment, the room acoustic echo canceler 24 and the line hybrid echo canceler 46 are trained during installation for an initial set of scaling parameters corresponding to the user's room and the telephone line, and these scaling parameters are the starting point for the system each time the system is turned on.

As noted above, the characteristics of the echo canceler 46 and 24 are such that it will tend, in effect, to construct an echo canceling or hybrid matching model. However, such construction takes a noticeable period of time and good operation can be achieved by first noting an initial set of conditions for either the room (in the case of the room acoustic echo canceler 24) or the telephone line (in the case of the line hybrid echo canceler 46). The same is achieved by application of an artificial signal to the system, allowing it to train and determine an initial set of amplitude parameters for the various time delays involved.

In accordance with the preferred embodiment, a white noise generator 78 is provided. White noise generator 78 puts out a range of frequencies in the audio range and is switchable by switch 79 to be connected to the input of limiter 52. This causes sounds to appear at the output of speaker 58 which in turn are reflected by various objects in the room or follow a direct path to microphone 12. These signals are then sent via analog-to-digital converter 16 to digital adder 20. A portion of the output of the white noise generator is sent from the output of limiter 52 through amplifier 76 to room acoustic echo canceler 24. Echo canceler 24 compares the output of amplifier 76 to the signal picked up by microphone 12, producing a different signal which is sent to room acoustic echo canceler 24. This allows echo canceler 24 to continually adjust parameters, that is to say, to continually adjust the amplitude of the echoes until a set of amplitudes for each of the echoes is reached which allows the white noise signal output by speaker 58 and received by microphone 12 to be completely canceled by a cancellation signal which appears at the outputs of room acoustic echo canceler 24 and is sent to digital adder 20.

In principle, for white noise, the input to the positive input of adder 20 will be made equal to the input to the negative input of adder 20 by echo canceler 24 which monitors the output of adder 20 which is coupled to the input of expander 26. Once the parameters for the room acoustic echo canceler 24 have been set, they will remain set and will be varied dynamically as changes occur in the room due to movement of people, or the like. In accordance with the preferred embodiment, it is contemplated that the white noise calibration discussed above, which takes a few seconds, will be done when the system is installed. Once this is done, the room acoustic echo canceler has, effectively, modelled the room and modelled the echo pattern in the room and provided for cancellation of the same.

In similar fashion, the system may be trained to the telephone line through the input of the signal output of the white noise generator 78 into the telephone system two wire line by its being coupled to the input of a bandpass filter 28. This is done in a separate operation. When this is done, white noise is caused to enter the two wire telephone system by passing through bandpass filter 28, limiter 30 and digital-to-analog converter 32. Portions of this signal leak across hybrid impedance $Z_h$ and are passed to amplifier 40. In similar fashion, the line also passes portions of this signal through amplifier 40. This signal is then passed through the system to digital adder 44. During the training period, the digital adder 44 compares this signal to the output of the various taps in the line hybrid echo canceler 46 and echo canceler 46 adjusts the amplitudes at these various taps to produce a signal which, when added to the output of analog-to-digital converter 42, results in a signal of zero output or, to be more precise, a minimum output which output is sampled at the output of digital adder 44 and sent to line hybrid echo canceler 46 as illustrated in FIG. 1. Once the training has been completed, the various parameters of the delay line, corresponding to scaling factors calculated and provided by digital logic circuit 68, are stored and effectively result in the cancellation of all signals which originate with white noise generator 78 and which have been passed through the two wire telephone system 34 to the amplifier 40.

As can be seen from the above, the training operation has the effect of suppressing of undesired signals. In the case of signals emitted by speaker 58, the room acoustic echo canceler effectively prevents them from passing beyond digital adder 20. This is so even though they may be picked up by microphone 12 and sent to the two wire telephone system 34 and they are thus prevented from being transmitted by speaker 58, thus removing the problem of acoustic feedback, and allowing for full duplex use of a conventional two wire telephone line.

The general operation of the circuit above can thus be seen to comprise the transmission of the voice of the telephone user from pickup microphone 12 through amplifier 14, analog-to-digital converter 16, low pass filter 18, adder 20, expander 26, bandpass filter 28, limiter 30 and digital-to-analog converter 32. High pass filter 18 has the effect of removing room noise, rumble and other signals of relatively low frequency from the system.

The location in the signal train of expander 26 and bandpass filter 28, as well as limiter 30 at the output of room acoustic echo canceler 24 is critical to proper functioning of the system. In particular, if these circuits were placed between, for example, analog-to-digital converter 16 and high pass filter 18, their characteristics would be compensated for by room acoustic echo canceler 24. Likewise, the positioning of the expander 48, automatic gain control 50 and limiter 52, at the output of chip 70, prevents the effect of these circuits from being operated on by the line hybrid echo canceler 46. In addition, because these particular circuits are not linear and are dynamic, the echo canceling circuits would tend on the line or room side of the cancelers to hunt trying to compensate for a characteristic which is continually changing, causing serious deterioration of the system characteristics.

In accordance with the preferred embodiment, it has been found that the room acoustic echo canceler 24 must have a relatively large number of taps. In accordance with the preferred embodiment, 3,840 taps are used (corresponding to fifteen DSP 56,200 integrated circuits), with each of the taps corresponding to successive delays of 125 microseconds each with the first tap being taken at a delay of zero microseconds, the second tap being taken at a delay of 125 microseconds, the third tap being taken at a delay of 250 microseconds, etc. It can be trained by the closing of switch 81, sending white noise into the system and from loudspeaker 58 into the room.

In comparison, the line hybrid echo canceler 46 has 256 taps (corresponding to a single DSP 56200 integrated circuit) with the first tap corresponding to zero microseconds and successive taps corresponding to time intervals of 125 microseconds, with the second tap corresponding to a delay of 125 microseconds, the third tap corresponding to a delay of 250 microseconds, the fourth tap corresponding to a delay of 375 microseconds, and so forth. In accordance with the preferred embodiment, it is also possible to utilize a true duplex telephone system, that is to say, one in which separate paths are provided for transmitted and received signals. In such a case, the system may be configured to bypass the line hybrid echo canceler 46, but with the room acoustic echo canceler in place.

In accordance with the present invention, operation of the system is so effective that microphone 12 and loudspeaker 58 can be at or closer than a distance of eighteen, ten or six inches from each other or even closer, although it is thought that the larger end of this range provides superior results. This makes possible a single speaker telephone as a self contained unit. Costs of such a device can be reduced by reducing the number of taps in the room acoustic echo canceler.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A speaker telephone for use with a two wire telephone system, comprising:

(a) an audio input circuit for receiving an audio signal to be transmitted over a conventional two-wire telephone system;

(b) a transmitted signal processing circuit for receiving an audio signal and altering the audio characteristics thereof, and providing the altered audio characteristics at the output of said signal processing circuit, said transmitted signal processing circuit further comprising an expander;

(c) an output coupling circuit coupled to the output of said transmitted signal processing circuit and connected to couple the altered audio signal output of said transmitted signal processing circuit to the input of said two wire telephone system;

(d) an input coupling circuit for coupling the output wire of said two wire telephone system to said speaker telephone;

(e) a first line hybrid echo canceler coupled to receive the output of said transmitted signal processing circuit, and produce a plurality of first echo outputs in response to said transmitted signal processing circuit output and having a first error signal input;

(f) a first difference circuit having an input of first polarity coupled to the output of said input coupling circuit, and inputs of opposite polarity coupled to said echo outputs of said first line hybrid echo canceler, said difference circuit having a difference output producing the difference between signals present at said first polarity input and a pair of inputs of opposite polarity, the output of said first difference circuit being coupled to said first error signal input;

(g) an audio output circuit coupled to the output of said difference circuit and having an electrical output; and (h) a loudspeaker coupled to the output of said audio output circuit to convert said electrical output into a desired audio signal.

2. A speaker telephone for use with a two-wire telephone system as in claim 1, wherein said transmitted signal processing circuit comprises a bandpass filter.

3. A speaker telephone for use with a two-wire telephone system as in claim 2, wherein said transmitted signal processing circuit further comprises a limiter.

4. A speaker telephone for use with a two-wire telephone system as in claim 1, further comprising a random signal generator connectable to said two wire telephone system input for providing an audio signal to allow said line hybrid echo canceler to compensate for the characteristics of the two wire telephone system using said random signal as a test input.

5. A speaker telephone for use with a two-wire telephone system as in claim 1, wherein said audio input circuit further comprises a microphone coupled to an amplifier and said loudspeaker is within the same cabinet as said microphone.

6. A speaker telephone for use with a two-wire telephone system as in claim 1, wherein said audio input circuit further comprises a microphone coupled to an amplifier and said loudspeaker and said microphone are within eighteen inches of each other.

7. A speaker telephone for use with a two-wire telephone system as in claim 6, wherein said loudspeaker and said microphone are within ten inches of each other.

8. A speaker telephone for use with a two-wire telephone system as in claim 6, wherein said loudspeaker and said microphone are within six inches of each other.

9. A speaker telephone as in claim 1, wherein said expander reduces the amplitude of said audio signal when it falls below a threshold.

10. A speaker telephone as in claim 9, wherein said reducing in amplitude is more pronounced for audio signals of lower magnitudes and below said threshold as compared to audio signals of higher magnitudes and below said threshold.

11. A speaker telephone for use with a two-wire telephone system as in claim 1, wherein said audio input circuit further comprises a microphone coupled to an amplifier.

12. A speaker telephone for use with a two-wire telephone system as in claim 11, wherein said audio input circuit further comprises:
 (i) a second echo canceler coupled to receive the output of said microphone, and produce a plurality of second echo outputs in response to said microphone output, and having a second error signal input; and
 (ii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity input, the output of said second difference circuit being coupled to said transmitted signal processing circuit and said second error signal input, wherein said second echo canceler is coupled to the output of said first difference circuit, and wherein said audio input circuit further comprises an analog-to-digital converter, said output coupling circuit comprises a digital-to-analog converter, said input coupling circuit comprises an analog-to-digital converter and said audio output circuit comprises a digital-to-analog converter.

13. A speaker telephone for use with a two-wire telephone system as in claim 12, further comprising a random signal generator connectable to said loudspeaker for providing an audio signal to allow said second echo canceler to compensate for the characteristics of a room within which said audio input circuit is located.

14. A speaker telephone for use with a two-wire telephone system as in claim 13, wherein further comprising a random signal generator connectable to said two wire telephone system input for providing an audio signal to allow said line hybrid echo canceler to compensate for the characteristics of the two wire telephone system using said random signal as a test input.

15. A speaker telephone for use with a two-wire telephone system as in claim 14, wherein said audio input circuit further comprising:
 (i) a microphone for generating said audio signal to be transmitted:
 (ii) a second echo canceler coupled to receive the output of said microphone, and produce a plurality of second echo outputs in response to said microphone output, and having a second error signal input; and
 (iii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity inputs, the output of said second difference circuit being coupled to said transmitted signal processing circuit and said second error signal input, wherein said second echo canceler is coupled to the output of said first difference circuit.

16. A speaker telephone for use with a two-wire telephone system as in claim 11, wherein said audio input circuit further comprises:
 (i) a second echo canceler coupled to receive the output of said microphone, and produce a plurality of second echo outputs in response to said microphone output, and having a second error signal input; and
 (ii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity inputs, the output of said second difference circuit being coupled to said transmitted signal processing circuit and said second error signal input, wherein said second echo canceler is coupled to the output of said first difference circuit.

17. A speaker telephone for use with a two-wire telephone system as in claim 11, wherein said audio output circuit comprises an automatic gain control circuit.

18. A speaker telephone for use with a two-wire telephone system as in claim 17, wherein said audio input circuit further comprises:
 (i) a second echo canceler coupled to receive the output of said microphone, and produce a plurality of second echo outputs in response to said microphone output, and having a second error signal input; and
 (ii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity inputs, the output of said second difference circuit being coupled to said transmitted signal processing circuit and said second error signal input, wherein said second echo canceler is coupled to the output of said first difference circuit.

19. A speaker telephone for use with a two-wire telephone system as in claim 18, wherein said audio input circuit further comprises an analog-to-digital converter, said output coupling circuit comprises a digital-to-analog converter, said input coupling circuit comprises an analog- to-digital converter and said, audio output circuit comprises a digital-to-analog converter.

20. A speaker telephone for use with a two-wire telephone system as in claim 19, further comprising a random signal generator connectable to said two wire telephone system input for providing an audio signal to allow said line hybrid echo canceler to compensate for the characteristics of the two wire telephone system using said random signal as a test input.

21. A speaker telephone for use with a two-wire telephone system as in claim 19, further comprising a random signal generator connectable to said loudspeaker for providing an audio signal to allow said second echo canceler to compensate for the characteristics of a room within which said audio input circuit is located.

22. A speaker telephone for use with a two-wire telephone system as in claim 21, further comprising a random signal generator connectable to said two wire telephone system input for providing an audio signal to allow said line hybrid echo canceler to compensate for the characteristics of the two wire telephone system using said random signal as a test input.

23. A speaker telephone for use with a two wire telephone system comprising:

(a) an audio input circuit for receiving an audio signal to be transmitted over a conventional two-wire telephone system;

(b) a transmitted signal processing circuit for receiving said audio signal and altering the audio characteristics thereof, and providing the altered audio characteristics at the output of said signal processing circuit, said transmitted signal processing circuit further comprising an expander;

(c) an output coupling circuit coupled to the output of said transmitted signal processing circuit and connected to couple the altered audio signal output of said transmitted signal processing circuit to the input of said two wire telephone system;

(d) an input coupling circuit for coupling the output wire of said two wire telephone system to said speaker telephone;

(e) a first line echo canceler coupled to receiver the output of said transmitted signal processing circuit, and produce a plurality of first echo outputs in response to said transmitted signal processing circuit output and having a first error signal input, each of said plurality of first echo outputs having a stored scaling factor;

(f) a first difference circuit having an input of first polarity coupled to the output of said input coupling circuit, inputs of opposite polarity coupled to said echo outputs of said first line hybrid echo canceler, said difference circuit having a difference output producing the difference between signals present at said first polarity input and a pair of inputs of opposite polarity, the output of said first difference circuit being coupled to said first error signal input;

(g) an audio output circuit coupled to the output of said difference circuit and having an electrical output; and (h) a loudspeaker coupled to the output of said audio output circuit to convert said electrical output into a desired audio signal, wherein said expander reduces the amplitude of said audio signal when it falls below a threshold.

24. A speaker telephone for use with a two-wire telephone system as in claim 23, wherein said audio input circuit further comprises:

(i) a microphone for generating said audio signal to be transmitted;

(ii) a second echo canceler coupled to receive the output of said microphone, and produce a plurality of second echo outputs in response to said microphone output, and having a second error signal input; and (iii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity input, the output of said second difference circuit being coupled to said transmitted signal processing circuit and said second error signal input, wherein said second echo canceler is coupled to the output of said first difference circuit, and wherein said audio input circuit further comprises an analog-to-digital converter, said output coupling circuit comprises a digital-to-analog converter, said input coupling circuit comprises an analog-to-digital converter and said audio output circuit comprises a digital-to-analog converter.

25. A speaker telephone as in claim 23, wherein said reducing in amplitude is more pronounced for audio signals of lower magnitudes and below said threshold as compared to audio signals of higher magnitudes and below said threshold.

26. A speaker telephone for use with a two-wire telephone system as in claim 25, wherein said audio input circuit further comprises:

(i) a microphone for generating said audio signal to be transmitted;

(ii) a second echo canceler coupled to receive the output of said microphone, and produce a plurality of echo outputs in response to said microphone output, and having a second error signal input; and (iii) a second difference circuit having an input of first polarity coupled to said input audio signal and an input of opposite polarity coupled to said second echo outputs of said second echo canceler, said difference circuit having a difference output producing the difference between signals present at said first polarity input and said opposite polarity input, the output of said second difference circuit being coupled to said transmitted signal processing circuit and said second error signal input, wherein said second echo canceler is coupled to the output of said first difference circuit, and wherein said audio input circuit further comprises an analog-to-digital converter, said output coupling circuit comprises a digital-to-analog converter, said input coupling circuit comprises an analog-go-digital converter and said audio output circuit comprises a digital-to-analog converter.

* * * * *